April 20, 1943.  T. C. SCHENK  2,317,115

PARACHUTE

Filed Jan. 15, 1942

INVENTOR
Tamis C. Schenk
BY
Harry Radzinsky
ATTORNEY

Patented Apr. 20, 1943

2,317,115

UNITED STATES PATENT OFFICE 2,317,115

PARACHUTE

Tamis C. Schenk, Richmond Hill, N. Y., assignor to Richmond Screw Anchor Company, Inc., Brooklyn, N. Y., a corporation of New York Application January 15, 1942, Serial No. 426,830

1 Claim. (Cl. 244—145)

This invention relates to parachutes and particularly to means whereby the efficiency of a parachute may be increased, the landing or descending speed may be reduced and other advantages obtained.

In parachutes as constructed at the present time the efficiency of the same is primarily dependent upon the area of the surface presented, whereby gravity, cooperating with the presented surface area will cause a greater air pressure on the under or concave side of the parachute canopy than is presented on the top or outer side of it.

In the design of present-day parachutes, every effort is made to increase the pressure of the air against the under side of the canopy, while little or no effort has been directed toward setting up resistance on the outer or convex side of the canopy to thereby reduce the air pressure on that side. Thus, parachutes are compelled to be of relatively large diameter and in spite of that fact have a relatively high descending and landing speed which often results in fractured limbs or other injuries to the parachutist.

The primary object of the present invention is to provide a parachute in which the outer or convex side of the canopy shall be provided with means for destroying the normal "stream-line" contour of the same, such means constituting elements arranged or disposed over a substantial area of the canopy of the chute and tending to set up head resistance, diffuse the air flow, prevent rapid closing in of the air around the top surface of the canopy, thus materially reducing the air pressure on the top side of the canopy and resulting in a decreased descending speed. With the improved construction, it will be found possible to reduce the area of the canopy, thus enabling the parachute to be not only made at considerably less manufacturing cost, but enabling the same to be more compactly folded, and more readily packed and stowed. It is further contemplated that the arrangement of elements on the exterior of the canopy tending to decrease the air pressure on top of the canopy, will also materially aid in the opening of the parachute and other advantages will be secured as will be apparent to those skilled in this art.

Figure 1:
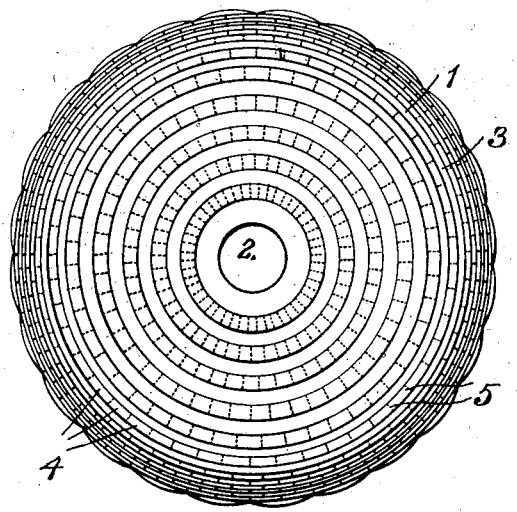
Figure 2:
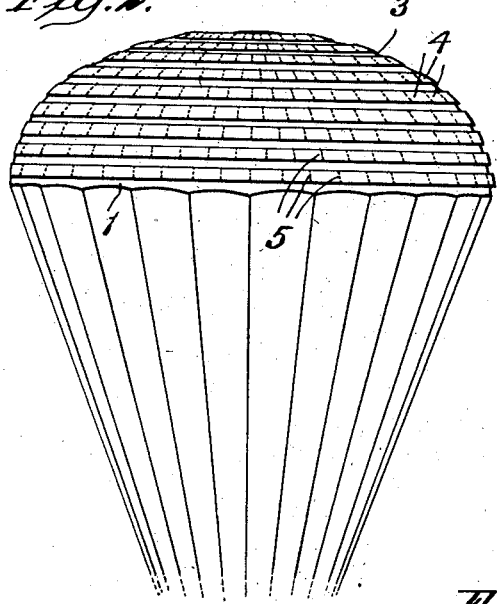
Figure 3:
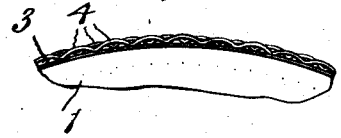
Figure 4:
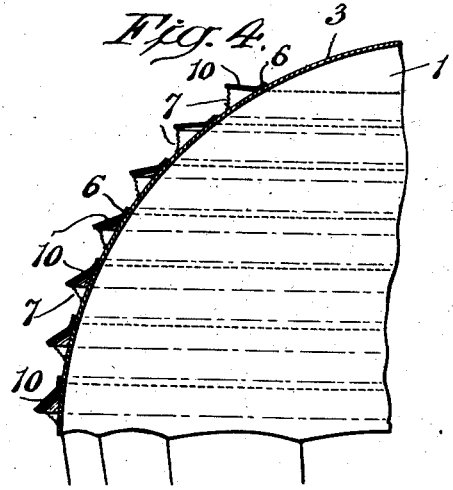
Figure 5:
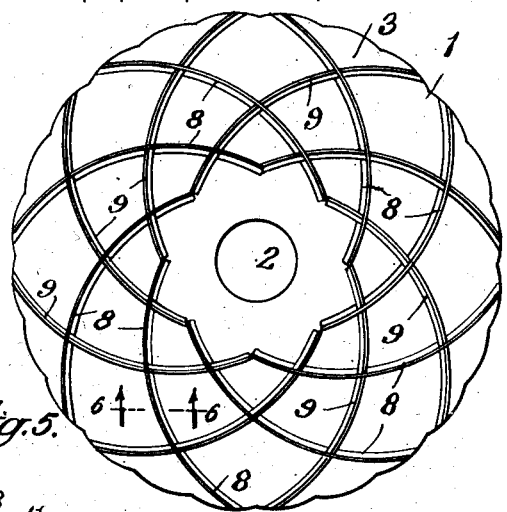
Figure 6:

In the accompanying drawing, wherein several embodiments of the invention are shown, Fig. 1 is a plan view of the canopy of a parachute constructed in accordance with the invention; Fig. 2 is a side elevation of the same; Fig. 3 is an edge view of the parachute canopy showing the arrangement of the projecting loops; Fig. 4 is a sectional view of a portion of the parachute canopy showing a modified construction; Fig. 5 is a plan view of another modified structure; and Fig. 6 is a sectional view on the line 6—6 of Fig. 5, looking in the direction of the arrows.

With reference to the structure shown in Figs. 1 to 3 inclusive, the canopy of the parachute is indicated at 1, the same being shown in its open or distended position. The body of the canopy is constructed in the usual manner of the conventional light-weight textile fabric, and of the numerous segments stitched together in the manner well understood in this art. The canopy may be provided with the conventional centrally located vent opening 2.

In usual parachute construction, the outer or convex face 3 of the canopy is relatively smooth and unbroken, except by the stitching or reinforcing seams and possibly by other small elements which do not serve to in any manner interrupt the smooth, continuous flow of air over the outer surface or top of the canopy, so that for all intents and purposes, the top surface of the canopy is substantially "stream-lined" and as the parachute rapidly descends, the air flowing past the edges of the canopy will smoothly flow around and over the top side of the canopy without impedance, thereby providing an air pressure on top of the canopy tending to materially increase the descending speed of the parachute. It is the purpose of the present invention to provide means by which the rapid "closing in" of the air over the top of the parachute will be prevented and the retarding of the imposition of material air pressure thereon will be attained, and with this in view several embodiments of the invention are disclosed.

In Figs. 1 to 3 is shown a plurality of looped elements 4 extending over a substantial portion of the area of the outer or convex face of the canopy of the parachute. These loops may be arranged to extend over the entire area of the outer surface of the canopy or they may be arranged only over such portion thereof as may be found necessary to secure the desired descending speed for a given expanse of canopy. In the form shown the loops are formed by securing lengthy strips or fabric tapes circumferentially around the canopy, by transverse lines of stitching 5 forming the loops so that while the parachute is in descent the loops will act to catch the air flow, break it up or diffuse it into a plurality of streams and materially retard it from closing over and exerting maximum pressure on the upper surface of the canopy. It will be noted that the loops in one of the strips are disposed in staggered relation to those in the adjacent strip as clearly disclosed in Fig. 3 to thereby further break up or diffuse the air flow.

As is clearly seen in Figs. 1 and 3, the fabric tapes or bands stitched to the outside of the canopy to form the pockets, are concentrically arranged and are located relatively close to one another. In fact, it is desirable to space these bands at distances no greater than the width of each of the bands so that air streams flowing into the pockets in one band will immediately enter or be diffused by those in the next band.

In the embodiment of the invention disclosed in Fig. 4 the top or convex face 3 of the canopy is provided with a plurality of circumferentially extending bands or webs 10, stitched to the canopy by the longitudinal lines of stitching 6. On the descent of the parachute, the air will strike against these webs, forcing the same to radially distended position, as shown in Fig. 4. A plurality of restraining cords 7 are employed to prevent the webs from being folded back against the surface of the canopy under the air pressure impinging against them.

In the embodiment of the invention disclosed in Fig. 5, the outer or convex surface of the canopy is provided with a plurality of spirally disposed fabric vanes, one group of vanes indicated at 8, extending on spiral lines in one direction, while those in the group indicated at 9 spiralling in an opposite direction. This opposite spiral arrangement prevents the parachute from being rotated during descent as would be likely to occur should a single set of spiral vanes, all spiralled in the same direction, be employed. These vanes may be composed of textile fabric strips or other material of flexible nature held by stitching 11 and capable of permitting collapse and folding of the canopy when the parachute is folded, packed and stowed.

While I have shown several embodiments of the invention, it will be obvious that various modifications may be made without departing from the spirit of the invention. The arrangement and disposition of the projecting elements on the outer or convex surface of the canopy, the area of the canopy over which these elements are disposed and other constructional details may be materially modified as will be comprehended by those skilled in this art. In the use of the parachute, the projecting elements disposed on the outside of the canopy will break up, diffuse or otherwise materially impede the flow of air over the top of the parachute canopy thereby materially reducing the pressure thereon and slowing down the descending speed of the parachute accordingly. Thus it will be obvious that the area or span of the canopy employed may be reduced with all of the advantages following therefrom.

What I claim is:

A parachute having a canopy provided with a plurality of concentrically arranged flexible bands secured to its outer surface and arranged in spaced relation thereon, said bands being spaced from one another at distances no greater than the width of each of the bands, the bands being transversely stitched at spaced points to provide loops adapted to be distended by air flow over the outer surface of the canopy and decrease the air pressure thereover, the transverse stitchings of one band being disaligned relative to those of the adjacent bands whereby the loops in each band are arranged in staggered relation to those in the adjacent bands.

TAMIS C. SCHENK.